US009754183B2

(12) United States Patent
Cho et al.

(10) Patent No.: US 9,754,183 B2
(45) Date of Patent: *Sep. 5, 2017

(54) SYSTEM AND METHOD FOR PROVIDING ADDITIONAL INFORMATION USING IMAGE MATCHING

(71) Applicant: Enswers Co., Ltd., Seoul (KR)

(72) Inventors: Hoon-young Cho, Seongnam-si (KR); Min-hyung Cho, Seoul (KR); Jaehyung Lee, Yongin-si (KR)

(73) Assignee: Enswers Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/358,117

(22) Filed: Nov. 21, 2016

(65) Prior Publication Data

US 2017/0083786 A1 Mar. 23, 2017

Related U.S. Application Data

(63) Continuation of application No. 14/441,310, filed as application No. PCT/KR2013/001709 on Mar. 4, 2013, now Pat. No. 9,536,175.

(30) Foreign Application Priority Data

Nov. 16, 2012 (KR) .................. 10-2012-0130365
Feb. 22, 2013 (KR) .................. 10-2013-0019253

(51) Int. Cl.
*G06K 9/46* (2006.01)
*G06F 17/30* (2006.01)
(Continued)

(52) U.S. Cl.
CPC ....... *G06K 9/4671* (2013.01); *G06F 17/3079* (2013.01); *G06F 17/30247* (2013.01);
(Continued)

(58) Field of Classification Search
CPC ............ G06K 9/4671; G06F 17/30256; G06F 17/3079
See application file for complete search history.

(56) References Cited

U.S. PATENT DOCUMENTS 6,711,293 B1  3/2004 Lowe
8,731,301 B1  5/2014 Bushman et al.
(Continued)

FOREIGN PATENT DOCUMENTS

KR  10-2010-0023270 A  3/2010
KR  10-2012-0007045 A  1/2012
(Continued)

OTHER PUBLICATIONS

H. Bay et al., "Speeded-Up Robust Features (SURF)", Computer Vision and Image Understanding, vol. 110, pp. 346-359, Jun. 2008.
(Continued)

*Primary Examiner* — David F Dunphy
(74) *Attorney, Agent, or Firm* — McDonnell Boehnen Hulbert & Berghoff LLP

(57) ABSTRACT

The present invention relates to a system and method for providing additional information using image matching. The present invention provides a system for providing additional information using image matching, including: a image input unit configured to receive a video or an image input from a user terminal; a query image determination unit configured to determine a query image, i.e., a query target, from the video or image received from the image input unit; a feature point extraction unit configured to extract feature points of the query image determined by the query image determination unit, and to generate feature point information of the extracted feature points; a reference meta-information database configured to store a structure image identifier (ID) of a structure image of a structure on which an original image has been installed, structure image feature point information (Continued)

of the structure image, and additional information to be provided to the user terminal in association with the structure image ID; an image matching unit configured to determine a matching structure image ID by comparing the feature point information of the query image generated by the feature point extraction unit with the structure image feature point information stored in the reference meta-information database; and an additional information provision unit configured to provide the additional information stored in association with the structure image ID determined by the image matching unit to the user terminal, and a method using the same.

20 Claims, 9 Drawing Sheets

(51) Int. Cl.
  *G06K 9/00* (2006.01)
  *H04N 21/278* (2011.01)
  *H04N 21/41* (2011.01)
  *H04N 21/4722* (2011.01)
  *G06K 9/62* (2006.01)
  *G06K 9/03* (2006.01)
(52) U.S. Cl.
  CPC ... *G06F 17/30256* (2013.01); *G06K 9/00671* (2013.01); *G06K 9/036* (2013.01); *G06K 9/6202* (2013.01); *H04N 21/278* (2013.01); *H04N 21/4126* (2013.01); *H04N 21/4722* (2013.01); *G06K 2209/27* (2013.01)

(56) References Cited

U.S. PATENT DOCUMENTS

| 2006/0002607 | A1 | 1/2006 | Boncyk et al. |
| 2009/0232358 | A1 | 9/2009 | Cross |
| 2010/0260426 | A1 | 10/2010 | Huang et al. |
| 2011/0103699 | A1 | 5/2011 | Ke et al. |
| 2013/0100296 | A1 | 4/2013 | Tang et al. |
| 2015/0286894 | A1 | 10/2015 | Cho et al. |

FOREIGN PATENT DOCUMENTS

| KR | 10-2012-0050714 A | 5/2012 |
| KR | 10-1165359 A | 7/2012 |
| KR | 10-2012-0102616 A | 9/2012 |
| KR | 10-2013-0008109 A | 1/2013 |

OTHER PUBLICATIONS

International Searching Authority, "Written Opinion of the International Searching Authority", PCT Pat. App. No. PCT/KR2013/001709, English Language Translation, dated Jul. 1, 2013.

Liu et al., "Interactive Wireless Electronic Billboard," 2004, Proceedings of the IEEE international Conference an Networking, Sensing & Control, pp. 553-558.

| original image ID | structure image ID | original image feature point info | structure image feature point info | structure location info (GPS information (latitude, longitude, altitude)) | additional info |
|---|---|---|---|---|---|
| ... | | | | ... | ... |
| 2715 | 2715#1 | | | (127.36.1, 5) | advertising video |
| | 2715#2 | | | (124,34.6, 17) | image |
| 4883 | 4883#1 | | | Moving | Webpage Link |
| 987 | 987#1 | | | ... | voice guidance message |
| ... | | | | ... | ... |

| structure image feature point info | feature points inside original image region{(x,y,s,θ,f),...}, feature points outside original image region{(x,y,s,θ,f),...} |
|---|---|

Fig. 5

SYSTEM AND METHOD FOR PROVIDING ADDITIONAL INFORMATION USING IMAGE MATCHING

CROSS REFERENCE TO RELATED APPLICATIONS

This patent application is a continuation of U.S. patent application Ser. No. 14/441,310, filed May 7, 2015, which is a U.S. national stage entry of PCT Patent Application No. PCT/KR2013/001709, filed Mar. 4, 2013, which claims priority to Korean Patent Application No. 10-2013-0019253, filed Feb. 22, 2013 and to Korean Patent Application No. 10-2012-0130365, filed Nov. 16, 2012.

TECHNICAL FIELD

The present invention relates to a system and method for providing additional information using image matching and, more particularly, to a system and method that can determine the location information of a user terminal based on a video or an image input from the user terminal using image matching technology and then provide various types of additional information based on the determined location information.

BACKGROUND ART

In a daily life environment, there are an enormous number of images everywhere you look around. The majority of these images are intended to transfer specific messages to viewers. For example, with respect to a method of performing advertisement using an image, although an advertisement has been provided via an outdoor billboard to which an output very-large image has been attached in its early stage, this method is recently being changed to a method of transferring a digitized image or video to the public present in a specific time span and in a specific space via a large-sized monitor. However, most current methods of transferring a message via an image still remain in a unilateral form in which a message is transferred from an image from a user.

In this respect, there is a need for the development of technology for enabling a provider who provides a specific image or video, such as an advertisement, to automatically determine whether a user has observed the corresponding image or video and then provide appropriate additional information to the user accordingly.

Meanwhile, Korean Patent Application Publication No. 10-2013-0008109 (published on Jan. 22, 2013) relates to "a mobile terminal, a news provision apparatus, and a location-based news provision method," and discloses a method of receiving location information from a mobile terminal and transmitting related news information based on the received location information to the corresponding terminal. However, the method requires that location information is accurately received from the terminal first, and thus the terminal itself should acquire location information. Accordingly, the method has a limitation in that news information cannot be provided to a terminal that cannot acquire location information because the terminal has no location information acquisition means or a terminal that does not transmit location information.

DISCLOSURE

Technical Problem

Accordingly, the present invention has been contrived keeping in mind the above problems occurring in the prior art, and an object of the present invention is to provide a system and method that can automatically determine whether a user has observed a structure image or video, such as an advertisement, attached to a structure, such as an outdoor billboard, and that can provide an appropriate type of additional information to the user accordingly.

Another object of the present invention is to provide a system and method that enable a query image, i.e., a comparison target, to be more accurately determined from among images or videos transmitted from a user, thereby increasing the efficiency of image matching.

A further object of the present invention is to provide a system and method that make use of the structure-related surrounding information of the feature point information of a structure image upon image matching, thereby enabling information about the identity and location of the structure image transmitted by a user to be accurately determined.

Yet another object of the present invention is to provide a system and method that can determine information about an angle at which a user terminal is located based on a structure image and information about a direction in which the user terminal is moving and that can provide additional information based on the determined information, thereby increasing the efficiency and accuracy of information provision.

Technical Solution

In order to accomplish the above objects, the present invention provides a system for providing additional information using image matching, including: a image input unit configured to receive a video or an image input from a user terminal; a query image determination unit configured to determine a query image, i.e., a query target, from the video or image received from the image input unit; a feature point extraction unit configured to extract the feature points of the query image determined by the query image determination unit, and to generate the feature point information of the extracted feature points; a reference meta-information database configured to store the structure image identifier (ID) of a structure image of a structure on which an original image has been installed, the structure image feature point information of the structure image, and additional information to be provided to the user terminal in association with the structure image ID; an image matching unit configured to determine a matching structure image ID by comparing the feature point information of the query image generated by the feature point extraction unit with the structure image feature point information stored in the reference meta-information database; and an additional information provision unit configured to provide the additional information stored in association with the structure image ID determined by the image matching unit to the user terminal.

In this case, the query image determination unit may include: a frame extraction unit configured to extract the input video as a plurality of frame images when the video is input from the user terminal; and a query image selection unit configured to determine the query image, i.e., the query target, from among the frame images extracted by the frame extraction unit.

The query image selection unit may determine the query image based on the gradient values of the frame images.

The query image may be determined based on scores that are calculated by the following equation:

$$\text{score} = \frac{\int |\nabla I(x, y)|^2 dxdy}{\int |I(x, y)|^2 dxdy}$$

$$= \frac{\sum_y \sum_x (I(x+1, y) - I(x-1, y))^2 + (I(x, y+1) - I(x, y-1))^2}{\sum_y \sum_x I(x, y)^2}$$

where (x, y) is x-axis and y-axis coordinate values of an frame image, and I(x, y) is an image data value at the coordinates (x, y) of the frame image.

The reference meta-information database may further include the original image ID of the original image and the original image feature point information of the original image; and the structure image feature point information may include feature point information inside an original image region and feature point information outside the original image region.

The feature point information outside the original image region may be formed by feature point information that does not match the original image feature point information when matching between the original image feature point information and the structure image feature point information is performed.

The image matching unit may determine N (where N is a natural number) structure image IDs of highest matching scores by comparing the feature point information of the query image extracted by the feature point extraction unit with the structure image feature point information stored in the reference meta-information database, and may finally determine a structure image ID by comparing the feature point information outside original image region corresponding to the determined structure image IDs with the feature point information of the query image.

The image input unit may receive the location information of the user terminal from the user terminal along with the video or image; the reference meta-information database may include structure location information stored in association with the structure image ID of the structure on which the original image has been installed; and the image matching unit may determine N (where N is a natural number) structure image IDs of highest matching scores by comparing the feature point information of the query image extracted by the feature point extraction unit with the structure image feature point information stored in the reference meta-information database, and may finally determine a structure image ID by comparing feature point information outside the original image region corresponding to the determined structure image IDs with the feature point information of the query image.

The system may further include a direction calculation unit configured to determine the first directional angle information of the user terminal directed toward the structure image.

The image input unit may additionally receive a video or an image input from the user terminal within a specific time interval; the query image determination unit, the feature point extraction unit and the image matching unit may determine a query image, i.e., a query target, from the additionally received video or image, extract feature points and then determine a matching structure image ID; the direction calculation unit may determine the second directional angle information of the user terminal directed toward the structure image and determine the direction of movement of the user terminal based on the first directional angle information and the second directional angle information; and the additional information provision unit may provide the stored additional information to the user terminal based on the structure image ID determined by the image matching unit and the direction of movement of the determined user terminal.

In accordance with another aspect of the present invention, there is provided a method of providing additional information using image matching, including: a first step of receiving a video or an image input from a user terminal; a second step of determining a query image, i.e., a query target, from the received video or image; a third step of extracting the feature points of the determined query image and generating the feature point information of the extracted feature points; a fourth step of determining a matching structure image ID by comparing the feature point information of the feature points of the extracted query image with structure image feature point information; and a fifth step of providing additional information, stored in association with the determined structure image ID, to the user terminal.

Advantageous Effects

In accordance with the present invention, there are provided a system and method that can automatically determine whether a user has observed a structure image or video, such as an advertisement, attached to a structure, such as an outdoor billboard, and that can provide an appropriate type of additional information to the user accordingly.

Furthermore, the present invention has the effect of providing a system and method that enable a query image, i.e., a comparison target, to be more accurately determined from among images or videos transmitted from a user, thereby increasing the efficiency of image matching.

Furthermore, the present invention has the effect of providing a system and method that make use of the structure-related surrounding information of the feature point information of a structure image upon image matching, thereby enabling information about the identity and location of the structure image transmitted by a user to be accurately determined.

Moreover, the present invention has the effect of providing a system and method that can determine information about an angle at which a user terminal is located based on a structure image and information about a direction in which the user terminal is moving and that can provide additional information based on the determined information, thereby increasing the efficiency and accuracy of information provision.

DESCRIPTION OF DRAWINGS

FIG. 5 is a diagram illustrating an example of the configuration of a reference meta-information database (160);

BEST MODE

Embodiments according to the present invention are described in detail below with reference to the accompanying diagrams.

Figure 1:
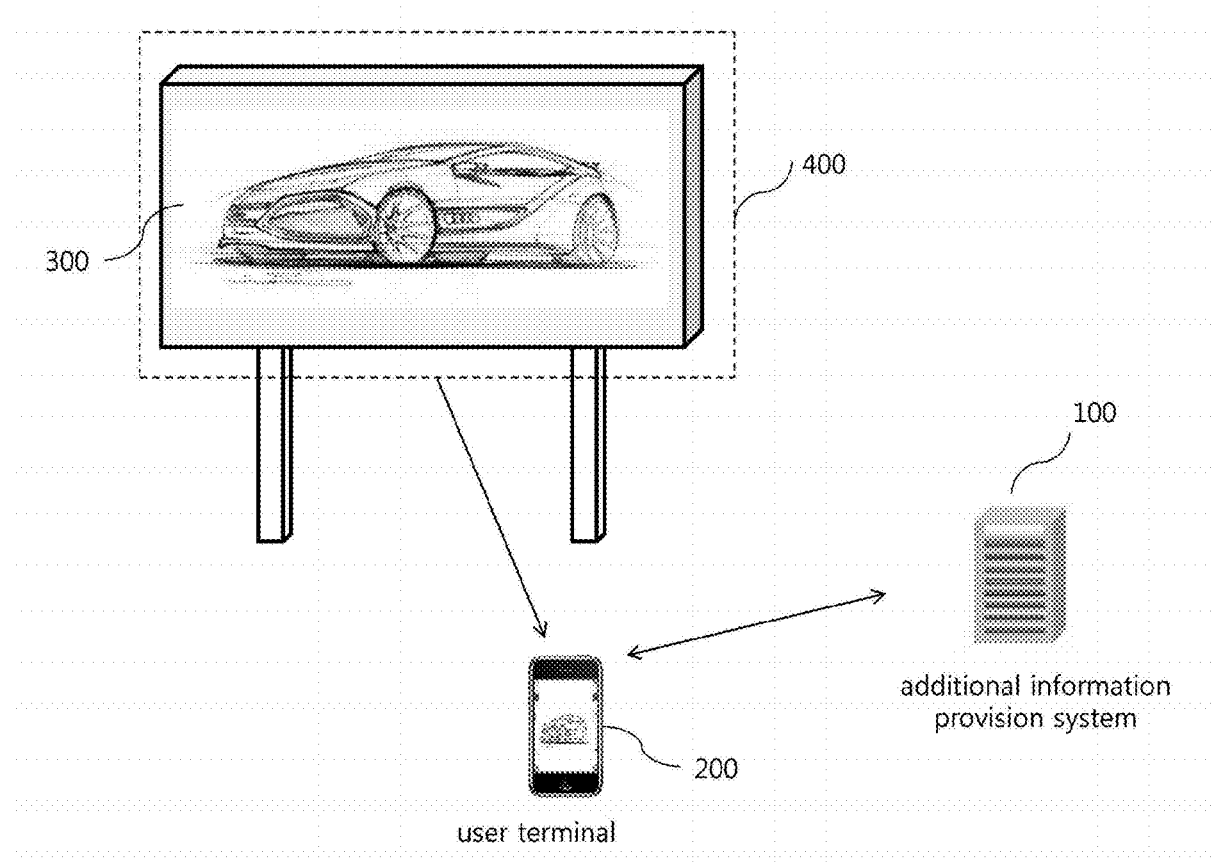
FIG. 1 is a diagram illustrating the overall configuration and connection relationship of a system (100) for providing additional information using image matching according to the present invention.

FIG. 1 is a diagram illustrating the overall configuration and connection relationship of a system 100 for providing additional information using image matching according to the present invention.

Referring to FIG. 1, the system 100 for providing additional information using image matching (hereinafter simply referred to as the "additional information provision system") according to the present invention is connected to a user terminal 200, and performs the function of receiving a video or an image, transmitted from the user terminal 200, from the user terminal 200, identifying a structure on which the video or image transmitted from user terminal 200 has been installed based on the reception, and providing various types of additional information based on the identification.

The video or image transmitted from the user terminal 200 is a video or an image 400 (hereinafter referred to as the "captured image") that is acquired by being captured by the user terminal 200. For this purpose, the user terminal 200 is provided with a video acquisition means, such as a camera or the like, that is known from conventional art.

The captured image 400 captured/acquired by the user terminal 200 and to be transmitted to the additional information provision system 100 is a video or an image that is captured in such a way that a user manipulates the user terminal 200 while centering on an image or a video installed on a structure (a structure attached image 300).

In this case, the term "structure" refers to a construction on (to) which an image or a video has been installed (attached), and may be, for example, an outdoor billboard in a street, as illustrated in FIG. 1. The outdoor billboard may include an image billboard to which an image has been attached, a video billboard, such as a large-sized display means, etc. For example, an automobile-shaped advertising image (the attached image 300) is attached to such a structure, as illustrated in FIG. 1. The user terminal 200 performs capturing while centering on the structure attached image 300, and transmits the captured image 400 to the additional information provision system 100.

Meanwhile, the structure attached image 300 may be a poster or a movie poster apart from an advertising image or an advertising video. Although the term "structure attached image 300" has been used in connection with FIG. 1 for ease of description, this is defined as corresponding to a concept including not only an image (that is, a still image) but also a moving image (a video), and is used based on the same concept in the following description.

Although the user terminal 200 performs capturing while centering on the structure attached image 300 installed on a structure through the manipulation of a user, the actually captured image 400 may include part or all of the structure attached image 300 and thus may include an image or a video of the structure. Accordingly, the video or image (captured image 400) transmitted to the additional information provision system 100 may include not only the structure attached image 300 but also a video or an image of a structure around the image 300, as indicated by dotted lines in FIG. 1. According to the present invention, when the video or image of the structure including the structure attached image 300 is included in the video or image transmitted from the terminal 200, image matching may be performed based on the video or image of the structure including the structure attached image 300, thereby increasing the accuracy of matching, as will be described later.

It will be apparent that the video or image acquired by the user terminal 200 may not include the video or image of the structure but may include part or all of the structure attached image 300, in which case matching is performed through image matching performed on the structure attached image 300.

The term "structure attached image 300" used herein refers to an image or a video attached to a structure, and the term "captured image 400" used herein refers to a video or an image that the user terminal 200 captures while centering on the structure attached image 300 and that is transmitted to additional information provision system 100. The captured image 400 includes part or all of the structure attached image 300, and is defined as a video or an image that is captured to include not only the structure attached image 300 but also a video or an image of part or all of a structure.

Meanwhile, the user terminal 200 includes a well-known data transmission means for transmitting the captured image 400 to the additional information provision system 100, such as a communication module for transmitting data over a mobile communication network, or a wireless LAN interface for performing wireless LAN connection.

The user terminal 200 is based on a concept including, for example, a mobile communication terminal, a tablet computer, etc. It is preferred that the user terminal 200 according to the present invention is a mobile communication terminal, such as a smart phone. In another example, the user terminal 200 may be a digital camera including a data transmission means.

Next, the internal configuration and detailed operation of the additional information provision system 100 will be described with reference to FIG. 2.

Figure 2:
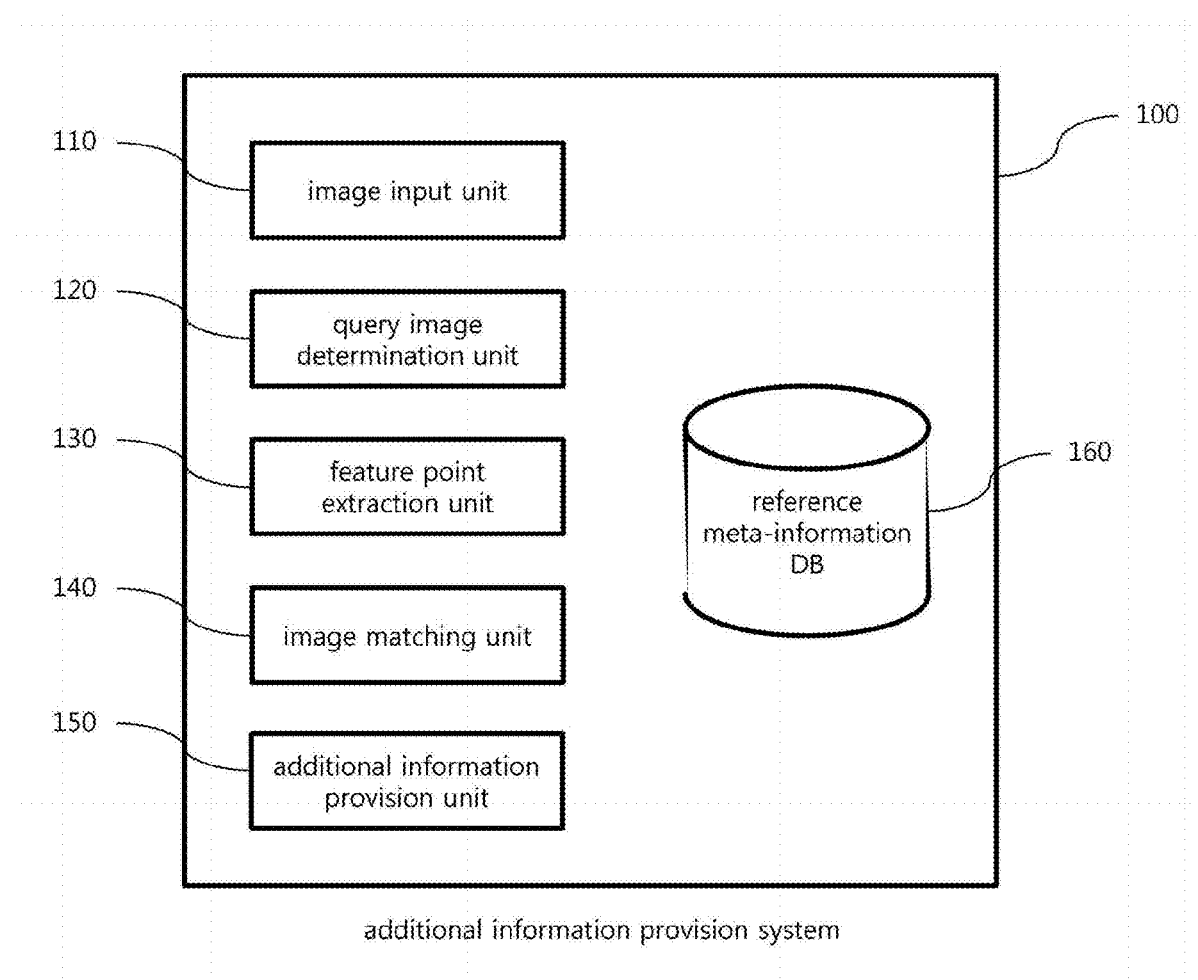
FIG. 2 is a diagram illustrating the configuration of an embodiment of the system (100) for providing additional information according to the present invention.

FIG. 2 is a diagram illustrating the configuration of an embodiment of the additional information provision system 100 according to the present invention.

Referring to FIG. 2, the additional information provision system 100 of the present embodiment includes a image input unit 110, a query image determination unit 120, a feature point extraction unit 130, an image matching unit 140, an additional information provision unit 150, and a reference meta-information database 160.

The image input unit 110 performs the function of receiving the video or image (the captured image 400) transmitted from the user terminal 200 and transmitting the received video or image to the query image determination unit 120.

As illustrated in FIG. 1, the user terminal 200 acquires the structure attached image 300 or the captured image 400, i.e., an image or a video of a structure including the structure attached image 300, and then transmits the acquired image to the additional information provision system 100. In this case, the user terminal 200 transmits the acquired image to the image input unit 110 of the additional information provision system 100. In this case, when acquiring the captured image 400, the user terminal 200 may capture the image in the form of a video (a moving image) or an image (a still image). The user terminal 200 transmits the video or image to the additional information provision system 100. In this specification, the term "video" refers to a moving image, and the term "image" refers to a still image.

The query image determination unit 120 performs the function of determining a query image, i.e., a query target, from the video or image (the captured image 400) received from the image input unit 110. The term "query image" refers to an image that is a target that is compared with structure image feature point information stored in the reference meta-information database 160, which will be described later.

As described above, the user terminal 200 acquires a video or image while centering on the structure attached image 300. In the process of acquiring a video or an image, there are many cases where a video or an image is acquired while part of the body of a user is shaking or a user is moving. Accordingly, there are many cases where a phenomenon in which the captured image 400 acquired by the user terminal 200 and transmitted to the additional information provision system 100 is partially or completely blurred occurs. Since a video or an image in which such a blurring phenomenon has occurred acts as one of the principal factors that reduce accuracy upon performing image matching (which will be described later), the query image determination unit 120 performs the function of determining a query image by selecting a frame of relatively low image quality degradation, i.e., the clearest frame, from the captured image 400, i.e., the video or image transmitted from the user terminal 200, thereby being able to increase the accuracy of image matching.

Figure 3:
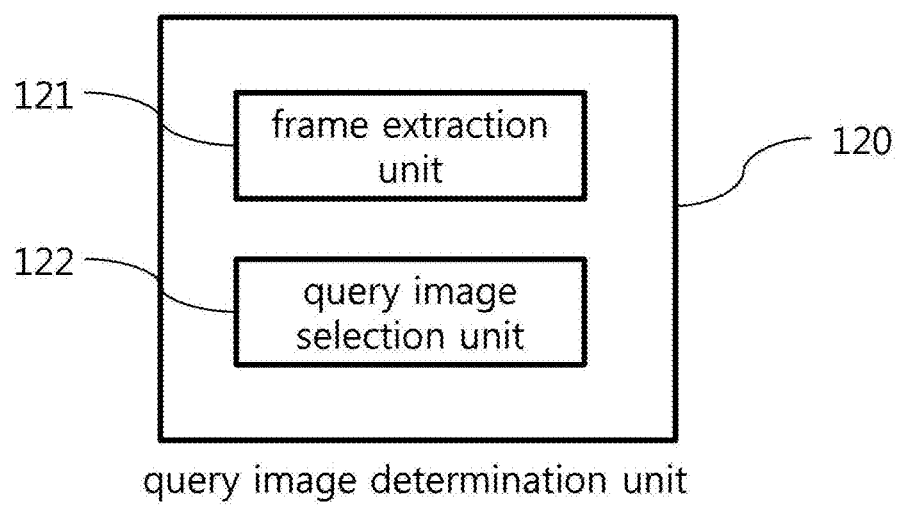
FIG. 3 is a diagram illustrating the internal configuration of a query image determination unit (120)

FIG. 3 is a diagram illustrating the internal configuration of the query image determination unit 120, and illustrates a configuration for determining a query image when a video is input from the user terminal 200.

Referring to FIG. 3, the query image determination unit 120 includes a frame extraction unit 121 and a query image selection unit 122.

The frame extraction unit 121 performs the function of extracting an input video as a plurality of frame images when the video is input from the user terminal 200. As described above, the term "video" used herein refers to a "moving image" (for example, in an avi or mpg file format). Such a video includes a plurality of frame images (i.e., a plurality of frame still images, as is well known. The frame extraction unit 121 performs the function of extracting a video as a plurality of frame images. The number of frames may be set to an appropriate value, for example, a few tens of frames per second, as required.

The query image selection unit 122 performs the function of selecting a query image, i.e., a query target, from among frame images extracted frame the extraction unit 121.

Although various well-known conventional methods may be used as a method of selecting a query image, the present invention may employ the following method. That is, a query image may be selected based on the gradient values of respective frame images.

Gradient is variation in the image data values of respective pixels constituting an image. As the value of gradient increases, the edge becomes clearer and shaking becomes lower. Accordingly, since a frame image of high gradient can be considered to be a clear image, it is preferable to select a frame image of high gradient as the query image.

In order to measure the degree of clarity of an image used to select a frame image of high gradient as the query image, a score function is defined as Equation 1 below:

$$score = \frac{\int |\nabla I(x, y)|^2 dxdy}{\int |I(x, y)|^2 dxdy}$$

$$= \frac{\sum_y \sum_x (I(x+1, y) - I(x-1, y))^2 + (I(x, y+1) - I(x, y-1))^2}{\sum_y \sum_x I(x, y)^2}$$

where (x, y) is the x-axis and y-axis coordinate values of an frame image, and I(x, y) is an image data value at the coordinates (x, y) of the frame image.

Meanwhile, in Equation 1, the image data value I(x, y) may be defined as the intensity of a pixel at the coordinates (x, y) of the frame image. The intensity may use, for example, R, G and B values or C, M, Y and K values at each pixel. Alternatively, for example, a gray image obtained by calculating the average value (R+G+B/3) of the R, G and B values of each pixel may be generated, and the value of each gray image ranging from 0 to 255 may be defined and used as the intensity of the pixel. That is, in Equation 1, I(x, y) is a value that may be appropriately selected based on an image data value, i.e., one of the various pixel values that each pixel has.

When the scores of the respective frame images are obtained using Equation 1, a frame image of the highest score can be selected from among the frame images. The selected frame image is an image of the highest gradient and the image of the highest gradient may be viewed as the clearest image, and thus this frame image is selected as the query image. If required, two or more frame images may be selected as the query image.

Figure 4:
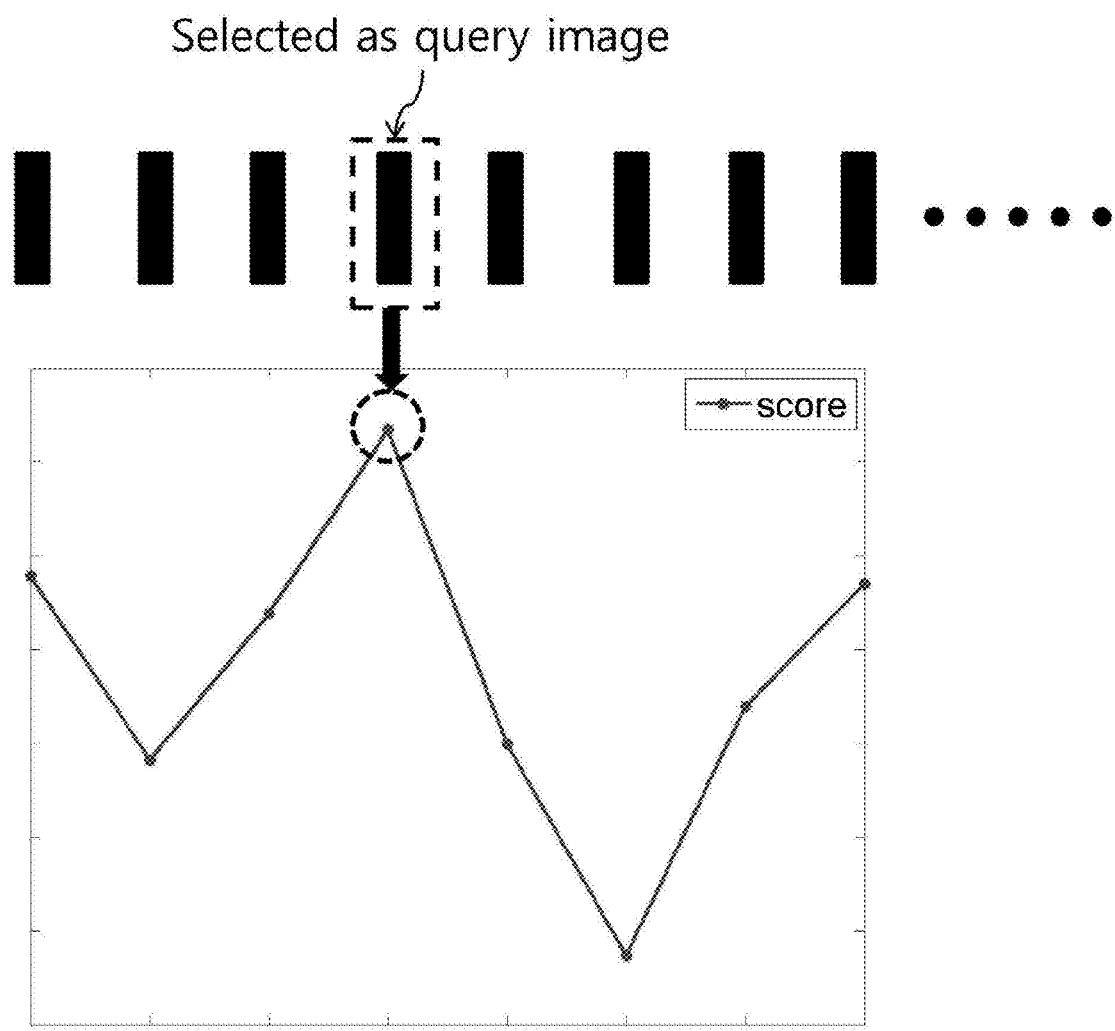
FIG. 4 is a diagram illustrating a process in which a specific frame is selected by the query image determination unit (120) using a score function.

FIG. 4 illustrates a process in which the query image determination unit 120 selects a query image from among frame images using the score function of Equation 1. As illustrated in FIG. 4, it can be seen that a frame image having a value that is the highest of scores, i.e., the result values of Equation 1, is selected as the query image by the query image determination unit 120.

Meanwhile, the query image determination unit 120 selects a single input image as the query image when the single image other than a video is input from the user terminal 100. When two or more images are input from the user terminal 100, these images may be considered to be respective frame images and then the query image may be selected using the above-described process.

Next, the feature point extraction unit 130 is described with reference to FIG. 2 again.

The feature point extraction unit 130 performs the function of extracting the feature points of the query image determined by the query image determination unit 120 using the above-described method and then generating the feature point information (feature point data) of the extracted feature points.

As is well known, the term "feature point" or "interest point" refers to a point capable of representing the feature of a given image in the given image, and refers to a point or a set of points capable of desirably describing the feature of an image regardless of variation in the image, such as the scale, rotation, distortion, etc. of the image. Although the number of feature points may varies with the size and content of a given image and the type of method of extracting feature points, hundreds to tens of thousands of feature points may be extracted from a single photo as an example. These feature points are being widely used in the fields of image processing and computer vision. For example, feature points are extracted, and corresponding portions are searched for in two images using the feature point information (feature point data) of the extracted feature points and then used for various tasks, such as object identification, operation tracking, and the determination of identity between images.

Various methods have been proposed as conventional technology for extracting feature points from a given image and generating feature point information. For example, a method using maximum and minimum values in the scale space of a Laplacian of Gaussian (LoG) filter or a Difference of Gaussians (DoG) filter is known. Additionally, a method of extracting feature points using the determinant of a Hessian matrix and then generating feature point information has been also proposed.

Furthermore, methods, such as the Scale-Invariant Feature Transform (SIFT) algorithm disclosed in U.S. Pat. No. 6,711,293 to David G. Lowe and the Speed Up Robust Features (SURF) algorithm disclosed in the paper by H. Bay, A. Ess, T. Tuytelaars, L. V. Gool, "Speeded-Up Robust Feature (SURF)," *Journal of Computer Vision and Image Understanding,* 110, pp. 346-359, 2008, have been proposed as a method of extracting the feature points of an image and generating the feature point information of the extracted feature points.

Furthermore, Korean Patent No. 10-1165359 filed and registered by the applicant of the present invention discloses a method of extracting feature points and generating feature point information that improves the above-described conventional method of extracting feature points and generating feature point data.

The feature point extraction unit 130 according to the present invention extracts the feature points of a query image and then generates the feature point information (feature data) of the feature points using a method known by the conventional technology. Since the present invention is not intended for a method of extracting feature points and generating feature point information itself and also may use a method of extracting feature points and generating feature point information, which is known by the conventional technology, without change, a detailed description thereof is omitted.

The image matching unit 140 performs the function of determining a matching structure image ID by comparing the feature point information of the feature points of a query image extracted by the feature point extraction unit 130 with the feature point information of a structure image stored in the reference meta-information database 160.

In this case, the reference meta-information database 160 is described first. The reference meta-information database 160 stores the structure image ID of a structure image of a structure on which an original image has been installed, the structure image feature point information of the structure image, and additional information to be provided to the user terminal in association with the structure image ID.

That is, the reference meta-information database 160 stores meta-information corresponding to the structure image ID, and allows the image matching unit 140 to determine a structure image ID that matches a query image.

FIG. 5 is a diagram illustrating an example of the configuration of the reference meta-information database 160.

Referring to FIG. 5, the reference meta-information database 160 stores an original image identifier (ID), a structure image ID, original image feature point information, structure image feature point information, structure location information, and additional information.

The original image ID is the ID of an original image installed (attached) on (to) a structure, such as a structure installed in a specific space, for example, an outdoor billboard or the like.

The structure image ID refers to the ID of an image of a structure on which the original image has been installed, and the ID of the image of the structure in which the original image is included. For example, when an advertising image has been installed on an outdoor billboard, a structure image is an image including the outdoor billboard on which the advertising image has been installed, and an original image refers to an image of the advertising image itself.

The original image feature point information refers to the feature point information of the feature points of the original image, and the structure image feature point information refers to the feature point information of the feature points of the structure image. In this case, the structure image feature point information is divided into feature point information inside an original image region and feature point information outside the original image region and then stored.

The feature point information inside the original image region refers to the feature point information of feature points present inside the original image region, and the feature point information outside the original image region refers to the feature point information of feature points present outside the original image region, other than inside the original image region, in the structure image.

Figure 6:
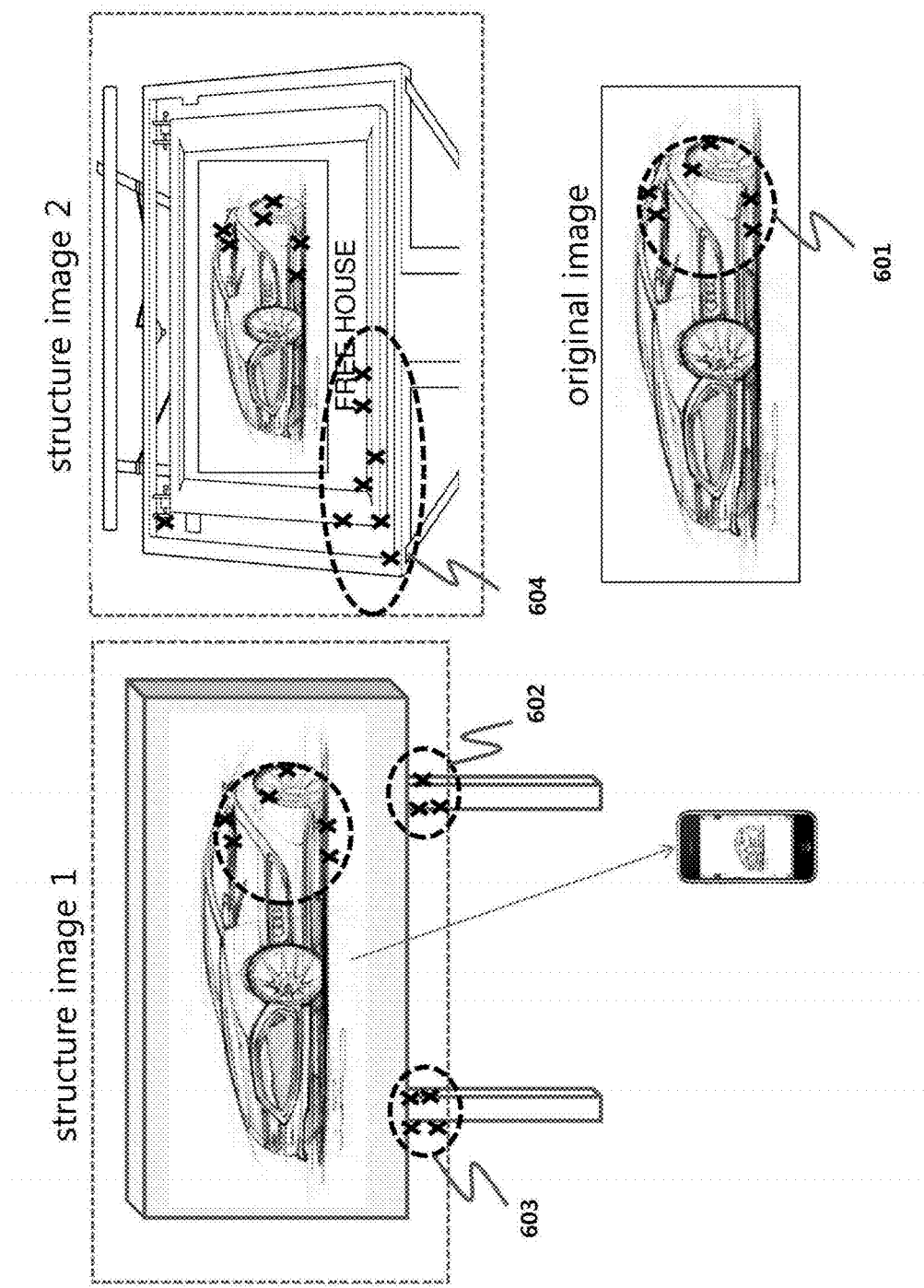
FIG. 6 is a diagram illustrating feature point information inside an original image region and feature point information outside an original image region.

FIG. 6 is a diagram illustrating feature point information inside an original image region and feature point information outside an original image region.

Referring to FIG. 6, original images are images of an "automobile," the original images are installed on structure 1 and structure 2, respectively, and structure image 1 and structure image 2 for the respective structures are indicated by dotted lines.

It can be seen that structure image 1 and structure image 2 are images of structures, including the respective original images, and include the respective original image, as indicated by the dotted lines.

In this case, the original images attached to structure image 1 and structure image 2 may have different sizes or different left-to-right ratios, or may have, for example, different advertising phrase or the like included in the images. The term "original image attached to a structure" used herein is based on a concept including the case where an image is completely identical to an original image and the case where an image is somewhat different in size, color or advertising phrase from an original image. Accordingly, an original image attached to a structure means that the source of the corresponding image is an actual original image.

Meanwhile, in FIG. 6, reference symbol 601 denotes feature points inside the original image region, and reference symbols 602, 603, and 604 denote feature points outside the original image region.

In this case, the feature point information outside the original image region may be formed by feature point information that does not matching the original image feature point information when matching between the original image feature point information and the structure image feature point information is performed. When matching between the original image feature point information and structure images 1 and 2 is performed, all feature points included in the original image are matched, but feature points not included in the original image, i.e., feature points present only inside the structure image, are not matched. These feature points that are not matched are considered to be feature points unique to each of the structure images, and may be selected as the feature point information outside the original image region.

The structure location information is the location information of a place where a structure is located, may be implemented in the form of, for example, GPS information (latitude, longitude, altitude), and is stored in association with a structure image ID. Although GPS information does not vary with respect to the location information of a structure located in a fixed place, structure location information continuously varies with respect to, for example, a structure image installed inside or outside a bus, and thus the structure location information is distinctively denoted with an indicator, such as "Moving," which is indicative of a moving structure image, other than fixed location information.

The additional information is stored in association with each structure image ID, and is additional information to be provided to the user terminal 200 in accordance with a structure image ID determined to be matched. The additional information includes various types of information, such as advertising moving image data, image data, web page link data, an audio guidance message, etc. The actual data of the additional information may be stored in a separate additional information database (not illustrated).

The image matching unit 140 determines a structure image, i.e., a structure image ID, which matches a query image by determining structure image feature point information matching the feature point information of the feature points of an query image, extracted by the feature point extraction unit 130, by referring to the reference meta-information database 160.

The image matching unit 140 may determine a structure image ID using the following method. First, the image matching unit 140 determines N (where N is a natural number) structure image IDs of the highest matching scores by comparing the feature point information of the query image extracted by the feature point extraction unit 130 with the structure image feature point information stored in the reference meta-information database 160. In this case, when performing comparison with the feature point information of the structure image, the image matching unit 140 may compare only feature points inside the original image region, may compare only feature points outside the original image region, or may compare both the feature points inside the original image region and the feature points outside the original image region, and uses an appropriate method as desired. These determined N structure image IDs become candidate structure image IDs.

Next, the image matching unit 140 finally determines a structure image ID by comparing the feature point information outside the original image region corresponding to the candidate structure image IDs with the feature point information of the query image. That is, the structure image can be accurately matched by comparing only the feature point information outside the original image region, exclusive of the feature point information inside the original image region, with the feature point information of the query image.

After the above process, the image matching unit 140 may determine a final matching structure image ID. Accordingly, structure image location information and additional information stored in association with the corresponding structure image ID may be determined.

Figure 7:
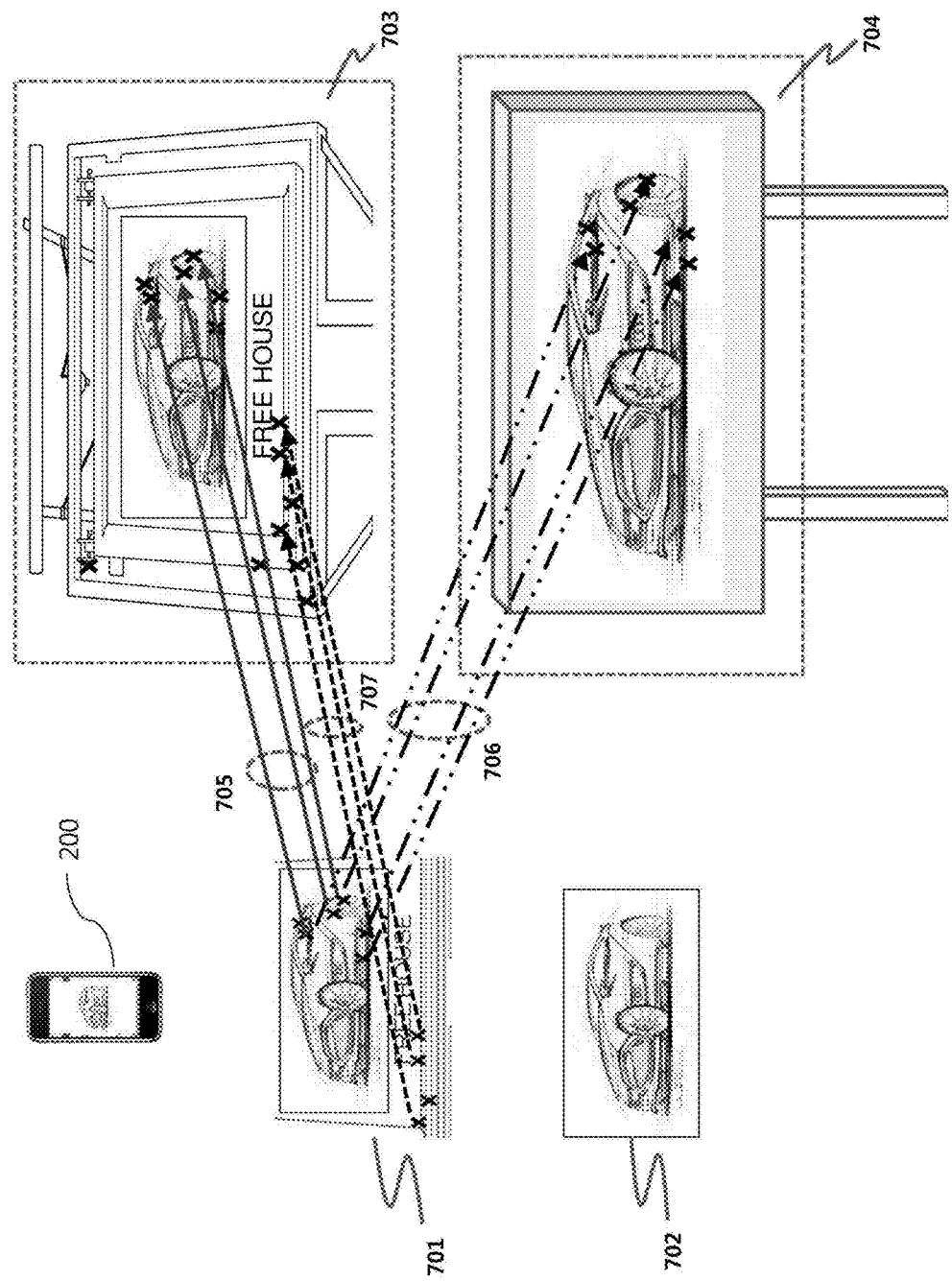
FIG. 7 is a diagram illustrating the operation of an image matching unit (140)

FIG. 7 is a diagram illustrating the operation of the image matching unit 140.

Referring to FIG. 7, reference symbol 701 denotes a query image selected from among videos or images (captured images), acquired by the user terminal 200, by the query image determination unit 120, and reference symbol 702 denotes an original image. Reference symbols 703 and 704 denote candidate structure images that correspond to N (which is 2 in this case) candidate structure image IDs determined by the image matching unit 140.

As described above, the image matching unit 140 determines N candidate structure image IDs by comparing the feature point information of the feature points of a query image extracted by the feature point extraction unit 130 with the structure image feature point information stored in the reference meta-information database 160. In FIG. 7, only the candidate structure images 703 and 704 corresponding to two candidate structure image IDs are illustrated for ease of description.

With respect to these candidate structure images 703 and 704, a final structure image ID is determined by comparing only the feature point information outside the original image region with the query image, as described above. Reference symbol 707 denotes the state in which the feature point information outside the original image region matches one of the candidate structure images, and reference symbols 705 and 706 denote the state in which the feature point information inside the original image region matches all the two candidate structure images.

Since the candidate structure images includes the original image, it is difficult to determine a structure image that is accurately matched by the query image using only the feature point information inside the original image region. Accordingly, when the feature point information outside the original image region is used, information about the surroundings of the original image region is included, and thus it is possible to determine a structure image that corresponds to the video or image acquired by the user terminal 200 based on the information about the surroundings of the original image region.

First, the image matching unit 140 of the user terminal 200 determines two candidate structure image IDs, as illustrated in FIG. 7, through primary matching, as described above. The reason for this is that all sets of the feature points inside the original image match each other, as indicated by reference symbols 705 and 706.

Next, when secondary matching, i.e., matching between pieces of feature point information outside the original image region, is performed on the candidate structure image IDs, only the structure image in the upper portion of the right side of FIG. 7 is matched, as indicated by reference symbol 707, and thus the image matching unit 140 may determine that this image is a final structure image and determine a structure image ID therefor.

Meanwhile, the image matching unit 140 may determine a structure image ID finally matching the query image from among the candidate structure ID images using the location information, for example, GPS information, of the user terminal 200. For this purpose, the user terminal 200 also transmits the location information of the user terminal 200, acquired by a GPS sensor or the like provided in the user terminal 200, to the image input unit 110 while transmitting the video or image to the image input unit 110, and the image matching unit 140 receives the location information of the user terminal 200 via the image input unit 110 and determines a final structure image ID based on the location information.

Next, the additional information provision unit 150 is described with reference to FIG. 2 again.

The additional information provision unit 150 performs the function of providing additional information, stored in association with the structure image ID determined by the image matching unit 140 using the above-described process, to the user terminal side. As described above, the additional information includes various types of information, such as advertising moving image data, image data, web page link data, audio guidance message, etc. Accordingly, for example, advertising moving image data may be provided by acquiring the advertising moving image data from an additional information database (not illustrated) and transmitting the acquired advertising moving image data to the user terminal 200.

Meanwhile, the additional information provision system 200 according to the present invention direction may further include a calculation unit (not illustrated) configured to determine the directional angle information of the user terminal 200 directed toward the structure image.

When a video or an image is input from the user terminal 200 and a query image is determined based on the input video or image, the directional angle information of the user terminal 200 that viewed the structure image at the time at which the query image was acquired (i.e., at the time at which the user terminal 200 captured the structure image) may be determined based on the front surface of the original image that matches the query image. A method of calculating directional angle information by comparing two images is widely known from the conventional technology.

Using the method of the conventional technology, the direction calculation unit (not illustrated) may acquire directional angle information based on the front surface of the structure image at the time at which the user terminal 200 acquired the structure image. When the directional angle information is known, a location where the user terminal 200 is placed may be determined based on the structure image, and additional information may be provided in accordance with the determined location. For example, the additional information of FIG. 5 is classified as information for the left side and information for the right side based on the front surface of the structure image, and then stored. Thereafter, whether a side in question is the left side or right side may be determined based on the directional angle information of the user terminal 200, and corresponding information may be provided. For example, when the user terminal 200 is located on the left side based on the front surface of the structure image, information about shops located near a corresponding area may be provided, and thus more accurate customized information may be provided.

Since the directional angle based on the front surface of the structure image may be determined at the time at which the user terminal 200 acquired the structure image, as described above, not only the location information of the user terminal 200 but also the movement direction information of the user terminal 200 may be determined using the determined directional angle.

That is, the additional information provision system 100 may additionally receive a video or an image of a specific structure image within a specific time interval after receiving a video or an image of the same structure image from the user terminal 200, and may determine a structure image ID corresponding to a query image using the above-described process. By doing so, the same structure image ID is determined with respect to the two input videos or images. With respect to the second input video or image, the directional angle information of the second input video or image, i.e., query image, based on the front surface of the structure image may be determined using the process described in conjunction with the direction calculation unit (not illustrated). When this information is referred to as second directional angle information and the directional angle information of the query image, acquired first, based on the front surface of the structure image is referred to as first directional angle information, the direction of movement of the user terminal 200 may be determined by comparing the first directional angle information and the second directional angle information.

Figure 8:
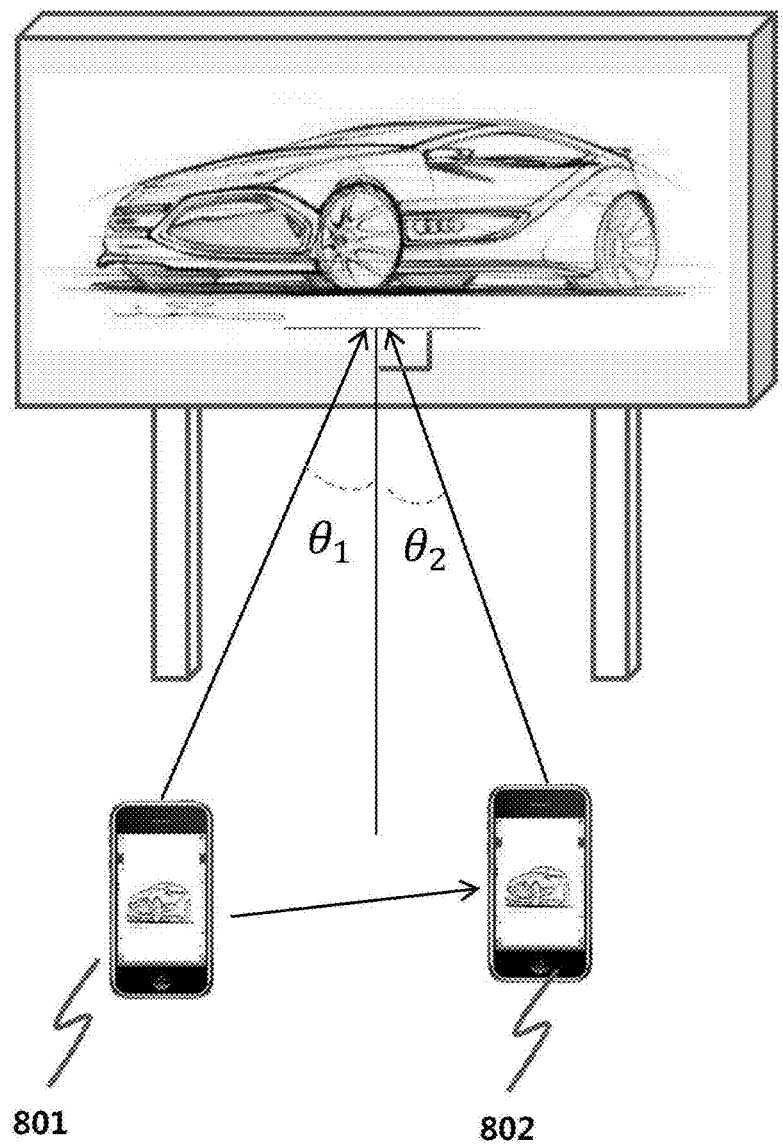
FIG. 8 is a diagram illustrating a process in which a direction calculation unit determines the direction of movement of a user terminal (200)

FIG. 8 is a diagram illustrating a process in which the direction calculation unit determines the direction of movement of the user terminal 200.

Referring to FIG. 8, the user terminal 200 captures a structure image first at the location of reference symbol 801, captures a structure image second at the location of reference symbol 802 within a specific time interval from the first capturing, and transmits the captured structure images to the additional information provision system 100.

The additional information provision system 100 determines a matching structure image using the above-described process, and also calculates directional angle information at each location, i.e., first directional angle information and second directional angle information.

In FIG. 8, $\theta_1$ and $\theta_2$ denote the first directional angle information and the second directional angle information, respectively. When in FIG. 8, the value of the angle changes from 0 degrees to 90 degrees in the left direction and from 0 degrees to 90 degrees in the right direction based on the front surface of the structure image, the direction of movement information of the user may be calculated based on the pieces of directional angle information of the user terminal 200 of two query images. For example, the case where $\theta_1 = \theta_2$ corresponds to the state in which the user terminal 200 remains stationary. Based on the relationship between $\theta_1$ and $\theta_2$, whether the user terminal 200 is moving to the left or right based on the front surface of the structure image may be easily determined. For example, when a movement from the location of reference symbol 801 to the location of reference symbol 802 is performed during a period from time t1 to time t2 (t1<t2), as illustrated in FIG. 8, $\theta_1$ is an angle of about 15 degrees and $\theta_2$ is an angle of about −15 degrees, and thus from this, it can be seen that the user terminal 200 has moved from the left side to the right side.

When the direction of movement of the user terminal 200, i.e., the direction of movement of the user, is determined as described above, it may be possible to provide additional information while additionally considering the direction of movement. For example, the additional information of FIG. 5 may be classified for the directions of movement and then stored, and corresponding information may be provided to the user terminal 200 in accordance with information about the direction of movement. For example, when the user terminal 200 is moving from the left to the right based on the front surface of the structure image, information about shops located in the direction of movement can be provided in accordance with the corresponding direction of movement, and thus accurate customized information provision is enabled.

Figure 9:
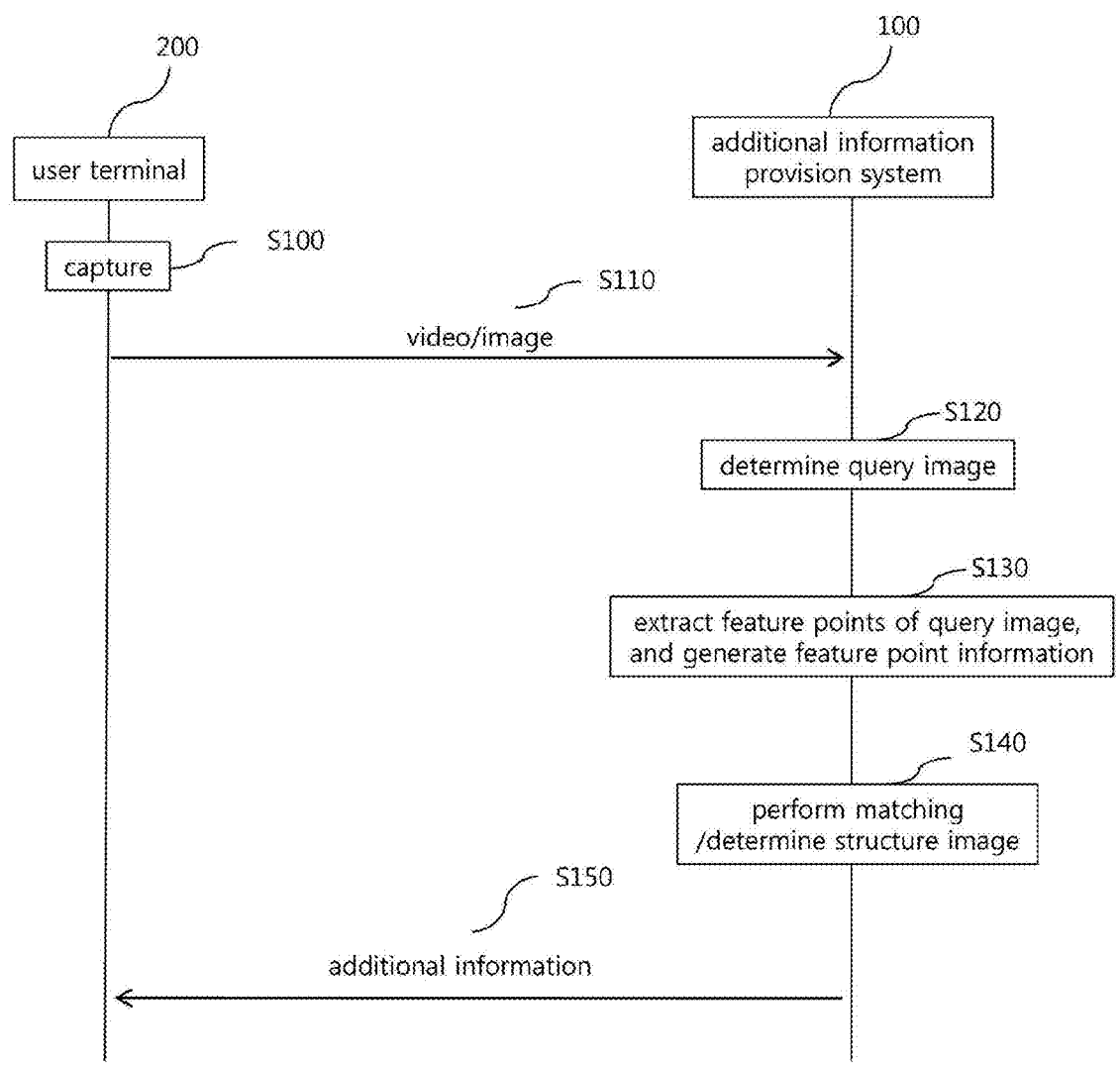
FIG. 9 is a flowchart illustrating an embodiment of a method of providing additional information to the user terminal (200) using the additional information provision system (100) of the present invention described with reference to FIGS. 1 to 8.

FIG. 9 is a flowchart illustrating an embodiment of a method of providing additional information to the user terminal 200 using the additional information provision system 100 of the present invention described with reference to FIGS. 1 to 8.

First, the user terminal 200 captures a structure image using a camera or the like at step S100, and transmits a video or image of the captured structure image to the image input unit 110 of the additional information provision system 100 at step S110.

The image input unit 110 transfers the received video or image to the query image determination unit 120 and the query image determination unit 120 determines a query image, i.e., a query target, using the above-described process at step S120.

Once the query image has been determined, the feature point extraction unit 130 extracts the feature points of the determined query image at step S130.

Thereafter, the image matching unit 140 determines a matching structure image ID by comparing the feature point information of the feature points of the query image extracted by the feature point extraction unit 130 with structure image feature point information stored in the reference meta-information database 160 at step S140.

Once the structure image ID has been determined, the additional information provision unit 150 provides additional information, stored in association with the determined structure image ID, to the user terminal 200 at step S150

Although the configuration of the present invention has been described with reference to the preferred embodiments of the present invention above, it will be apparent that the present invention is not limited to the embodiments but may be practiced in the form of various modification and variations within the scope of the present invention.

For example, each component of the additional information provision system 100 may be included in the configuration of the user terminal 200, or may be implemented via a separate server. For example, the image input unit 110, the query image determination unit 120, the feature point extraction unit 130, and the image matching unit 140 may be included in the user terminal 200, and only the additional information provision unit 150 may be implemented using a separate system. In this case, the components of the user terminal 200 may be implemented in the form of, for example, applications.

Furthermore, the image input unit 110 and the query image determination unit 120 may be implemented in the user terminal 200, and other components may be implemented using a separate system.

Aside from these methods, it should be noted that components constituting the additional information provision system 100 may be configured in various separate manners in terms of the load problem of a network, user convenience, efficiency, etc.

The invention claimed is:

1. A server, comprising:
   a reference meta-information database configured to store at least a structure image identifier of a structure image of a structure on which an original image has been installed, structure image feature point information of the structure image, and additional information associated with the structure image ID, and
   wherein the server configured to perform functions comprising:
      receiving a query image;
      extracting one or more feature points from the query image;
      generating feature point information based on the one or more feature points;
      determining a matching structure image ID by comparing the feature point information with the structure image feature point information stored in the reference meta-information database;
      providing additional information associated with the matching structure image ID.

2. The system of claim 1, wherein the query image is related to an input video, and wherein receiving the query image comprises:
   receiving the input video;
   extracting a plurality of frame images from the input video; and
   determining the query image from the plurality of frame images.

3. The system of claim 2, wherein determining the query image from the plurality of frame images comprises determining the query image based on one or more gradient values of the plurality of frame images.

4. The system of claim 3, wherein determining the query image based on the one or more gradient values of the plurality of frame images comprises determining one or more scores based on a score function operating on the one or more gradient values.

5. The system of claim 1, wherein the structure image feature point information comprises feature point information inside an original image region and feature point information outside the original image region.

6. The system of claim 5, wherein the feature point information outside the original image region is formed by feature point information that does not match the original image feature point information.

7. The system of claim 6, wherein the functions further comprise:
   determining one or more highest structure image IDs of highest matching scores by at least determining a structure image ID of the one or more highest structure image IDs based on a comparison of the feature point information outside the original image region corresponding to a highest structure image ID of the one or more highest structure image IDs with the feature point information of the query image.

8. The system of claim 7, wherein receiving the query image comprises receiving location information with the query image, and wherein the reference meta-information database further stores at least a structure location related to the original image.

9. The system of claim 1, wherein the functions further comprise:
   determining first directional angle information of a user terminal directed toward the structure image.

10. The system of claim 9, wherein the functions further comprise:
    receiving one or more second images;
    determining a second query image from the one or more second images;
    extracting one or more second feature points from the second query image;
    generating second feature point information based on the one or more second features points;
    determining that the matching structure image ID is associated with the second image based on a comparison of the second feature point information with the structure image feature-point information;
    determining second directional angle information of the user terminal based on the one or more second images; and
    determining a direction of movement of the user terminal based on the first directional angle information and the second directional angle information.

11. A method, comprising:
    receiving a query image;

extracting one or more feature points from the query image;

storing at least a structure image identifier of a structure image of a structure on which an original image has been installed, structure image feature point information of the structure image, and additional information associated with the structure image ID;

generating feature point information based on the one or more feature points;

determining a matching structure image ID by comparing the feature point information with the structure image feature point information; and providing the additional information associated with the matching structure image ID.

12. The method of claim 11, wherein the query image is related to an input video, and wherein receiving the query image comprises:

receiving the input video;

extracting a plurality of frame images from the input video; and determining the query image from the plurality of frame images.

13. The method of claim 12, where receiving the query image comprises determining the query image based on one or more gradient values of the plurality of frame images.

14. The method of claim 13, wherein determining the query image based on the one or more gradient values of the plurality of frame images comprises determining one or more scores based on a score function operating on the one or more gradient values.

15. The method of claim 1, wherein the structure image feature point information comprises feature point information inside an original image region and feature point information outside the original image region.

16. The method of claim 15, wherein the feature point information outside the original image region is formed by feature point information that does not match the original image feature point information.

17. The method of claim 15, further comprising:

determining one or more highest structure image IDs of highest matching scores by at least determining a structure image ID of the one or more structure image IDs based on a comparison of the feature point information outside the original image region corresponding to a highest structure image ID of the one or more highest structure image IDs with the feature point information of the query image.

18. The method of claim 17, wherein receiving the query image comprises receiving location information with the query image, and wherein the method further comprises receiving location information with the one or more images; and storing at least a structure location related to the original image.

19. The method of claim 1, further comprising:

determining first angle information of a user terminal directed toward the structure image.

20. The method of claim 19, further comprising:

receiving one or more second images;

determining a second query image from the one or more second images;

extracting one or more second feature points from the second query image;

generating second feature point information based on the one or more second features points;

determining that the matching structure ID is associated with the second image based on a comparison of the second feature point information with the structure image feature-point information;

determining second directional angle information of the user terminal based on the one or more second images; and determining a direction of movement of the user terminal based on the first directional angle information and the second directional angle information.

* * * * *

UNITED STATES PATENT AND TRADEMARK OFFICE
CERTIFICATE OF CORRECTION

| | | |
|---|---|---|
| PATENT NO. | : 9,754,183 B2 | Page 1 of 1 |
| APPLICATION NO. | : 15/358117 | |
| DATED | : September 5, 2017 | |
| INVENTOR(S) | : Hoon-young Cho et al. | |

It is certified that error appears in the above-identified patent and that said Letters Patent is hereby corrected as shown below:

In the Claims

Column 16, Line 3, the word 'system' should be --server--.

Column 16, Line 11, the word 'system' should be --server--.

Column 16, Line 15, the word 'system' should be --server--.

Column 16, Line 20, the word 'system' should be --server--.

Column 16, Line 24, the word 'system' should be --server--.

Column 16, Line 28, the word 'system' should be --server--.

Column 16, Line 38, the word 'system' should be --server--.

Column 16, Line 43, the word 'system' should be --server--.

Column 16, Line 47, the word 'system' should be --server--.

Column 17, Line 31, and Column 18, Line 17, for the claim reference numeral '1', each occurrence, should read --11--.

Signed and Sealed this
First Day of May, 2018

Andrei Iancu
*Director of the United States Patent and Trademark Office*